United States Patent [19]

Baker

[11] Patent Number: 5,485,716
[45] Date of Patent: Jan. 23, 1996

[54] DOUBLE ROW CANE HARVESTER

[75] Inventor: Malcolm J. Baker, Bundaberg, Australia

[73] Assignee: Autoft Industries, Limited, Queensland, Australia

[21] Appl. No.: 301,109

[22] Filed: Sep. 6, 1994

[30] Foreign Application Priority Data

Sep. 7, 1993 [AU] Australia ............... PM 1079

[51] Int. Cl.⁶ .................................. A01D 45/10
[52] U.S. Cl. ............... 56/14.3; 56/98; 56/500
[58] Field of Search ............... 56/14.3, 14.5, 56/60, 94, 98, 119, 500, 503

[56] References Cited

U.S. PATENT DOCUMENTS

| | | | |
|---|---|---|---|
| 3,940,913 | 3/1976 | Wallenfang et al. | 56/14.5 X |
| 4,019,308 | 4/1977 | Quick | 56/60 |
| 4,086,749 | 5/1978 | Greiner et al. | 56/14.3 X |
| 4,598,535 | 7/1986 | Sousek | 56/98 |

FOREIGN PATENT DOCUMENTS

| | | |
|---|---|---|
| 27649 | 5/1971 | Australia . |
| 463313 | 7/1975 | Australia . |
| 479316 | 12/1976 | Australia . |
| 574871 | 7/1988 | Australia . |

*Primary Examiner*—David J. Bagnell
*Attorney, Agent, or Firm*—Weil, Gotshal & Manges

[57] ABSTRACT

A cane harvester having at least two basecutter assemblies disposed so as to harvest cane stalks from at least two rows simultaneously. The harvester comprises a first basecutter assembly for severing a first row of cane stalks and at least a second basecutter assembly arranged so as to severe cane stalks in a row substantially parallel to the first row of cane stalks. The cane stalks severed by the second base cutter assembly are transported by a conveying means to a position proximate the first row of cane stalks so that the cane stalks can then be fed into the harvester.

17 Claims, 4 Drawing Sheets

DOUBLE ROW CANE HARVESTER

The present invention relates generally to harvesters and in particular to a multiple row harvester for sugar cane.

In conventional billet type sugar cane harvesters, stalks of cane are typically "topped" to remove the leafy top of the cane, cut at their base, and fed butt first by feed rollers through a chopping area in which the stalks of cane are cut into billets.

The rate of harvesting using such harvesters is primarily a function of the harvester and not the crop quantity being fed into the harvester. As a result, in poor seasons where crop yield is low, a harvester operator incurs similar operating costs to those in a good season but with a reduced return.

The present invention is designed to provide a harvester with an increased rate of harvesting, especially in seasons where crop yield is low, thereby reducing the operator's harvesting costs.

In a first aspect the present invention consists in a harvester for cane stalks which are planted in substantially parallel rows, comprising:

a frame having a first and a second side;

a first basecutter assembly, mounted rearwardly of a crop gathering area and coupled to the frame between its first and second sides, for severing a first row of cane stalks;

crop feeding means mounted immediately behind the first basecutter assembly that lift and feed the severed stalks to a chopping area that chops the stalks into billets;

a second basecutter assembly, mounted forwardly and outwardly from the first side of the frame, arranged to sever cane stalks in a row substantially parallel to the first row of cane stalks; and conveying means for transporting the cane stalks severed by the second basecutter assembly to a position proximate the first row of cane stalks such that the crop feeding means in addition to lifting and feeding the first row of cane stalks, lifts and feeds the severed cane stalks, transported from the substantially parallel row, to the chopping area.

In a preferred embodiment, the invention consists in a module, comprising the second basecutter assembly and conveying means, that is connectable to a sugarcane harvester in place of a crop divider, one of which is normally disposed on each side of the crop gathering area. In this embodiment, a secondary air extractor for removing trash from the billets is typically not operated with the second basecutter assembly and conveying means preferably driven by the hydraulic systems normally employed for the secondary air extractor and the removed crop divider, respectively.

In another embodiment of the invention, a second basecutter assembly is mounted forwardly and outwardly from both the first and second sides of the frame, each basecutter assembly having a corresponding conveying means, such that cane stalks from two substantially parallel rows are severed and transported to a position proximate the first row of cane stalks.

The basecutter assemblies each preferably comprise at least one cutter disc laving a plurality of cutter knives mounted about the periphery thereof. The cutter discs are preferably driven by a dedicated hydraulic motor through a gearbox. Each cutter disc is further preferably mounted at an angle to the ground such that the cane stalks are severed at or near ground level.

The basecutter assemblies are further preferably raisable and lowerable either automatically or manually by an operator of the harvester, so as to ensure the harvester can operate over rough terrain and be readily transported to the harvesting site without damaging the cutter discs.

The second basecutter assembly is preferably mounted on two support members that extend forwardly and outwardly from a side of the frame of the harvester. The support members are more preferably offset parallel linkage arms with the position of the arms and, accordingly, the disc cutters being controllable by an hydraulic or pneumatic ram. The support members are preferably supported on the frame of the cane harvester in place of one of the crop dividers which normally are disposed on either side of the crop gathering area.

The conveying means preferably comprises a pair of counter-rotating endless chains having an entrance, between which the cane stalks of the substantially parallel row enter and are held as the second basecutter assembly severs the stalks from the ground. The stalks after severance remain, in this preferred arrangement, in a substantially upright orientation as they are conveyed horizontally to a position proximate the first row of cane, at which point the stalks exit from between the chains.

The counter-rotating endless chains are preferably arranged so as to provide a converging entrance that ensures the stalks are guided to a position where they are gripped between the chains. There is further preferably attached to each chain a plurality of gripping means that provide an enhanced grip between the chains and the stalks while preventing substantial damage to the stalks before entrance to the harvester. The gripping means are preferably a plurality of rubber loops.

Each chain is preferably mounted on a plurality of support wheels. The support wheels are in turn preferably mounted on support arms. The support arms are preferably arranged to allow adjustments to the position of the support wheels so as to ensure correct tensioning of the chains. The support arms are further preferably arranged to be raisable and lowerable such that the height of the chains in relation to the cane stalks is adjustable by the operator of the harvester.

One of the support wheels for each chain is preferably driven by an hydraulic motor. Each of the driven wheels is preferably mounted at an end distal the converging entrance provided by the chains.

The crop feeding means preferably includes at least one butt roller that lifts the cane stalks and feeds them to a plurality of feeding rollers that in turn feed the stalks through the chopping area.

In the chopping area, the cane stalks are preferably chopped into billets by at least one chopper knife.

The harvester preferably includes a topper area. The topper area preferably extends forwardly from the frame of the harvester and severs the top of the first row of cane stalks prior to their severance from the ground by the first basecutter assembly.

The harvester also preferably includes a billet cleaning area and a slewable elevator means. As the billets pass through the cleaning area, trash and debris is preferably sucked from the billets by an extraction fan. The billets then preferably fall into a bowl in which they are conveyed upwardly by the elevator means before being dropped into a receiving vehicle.

By way of example only, a preferred embodiment of the invention will be described with reference to the following drawings.

Figure 1:
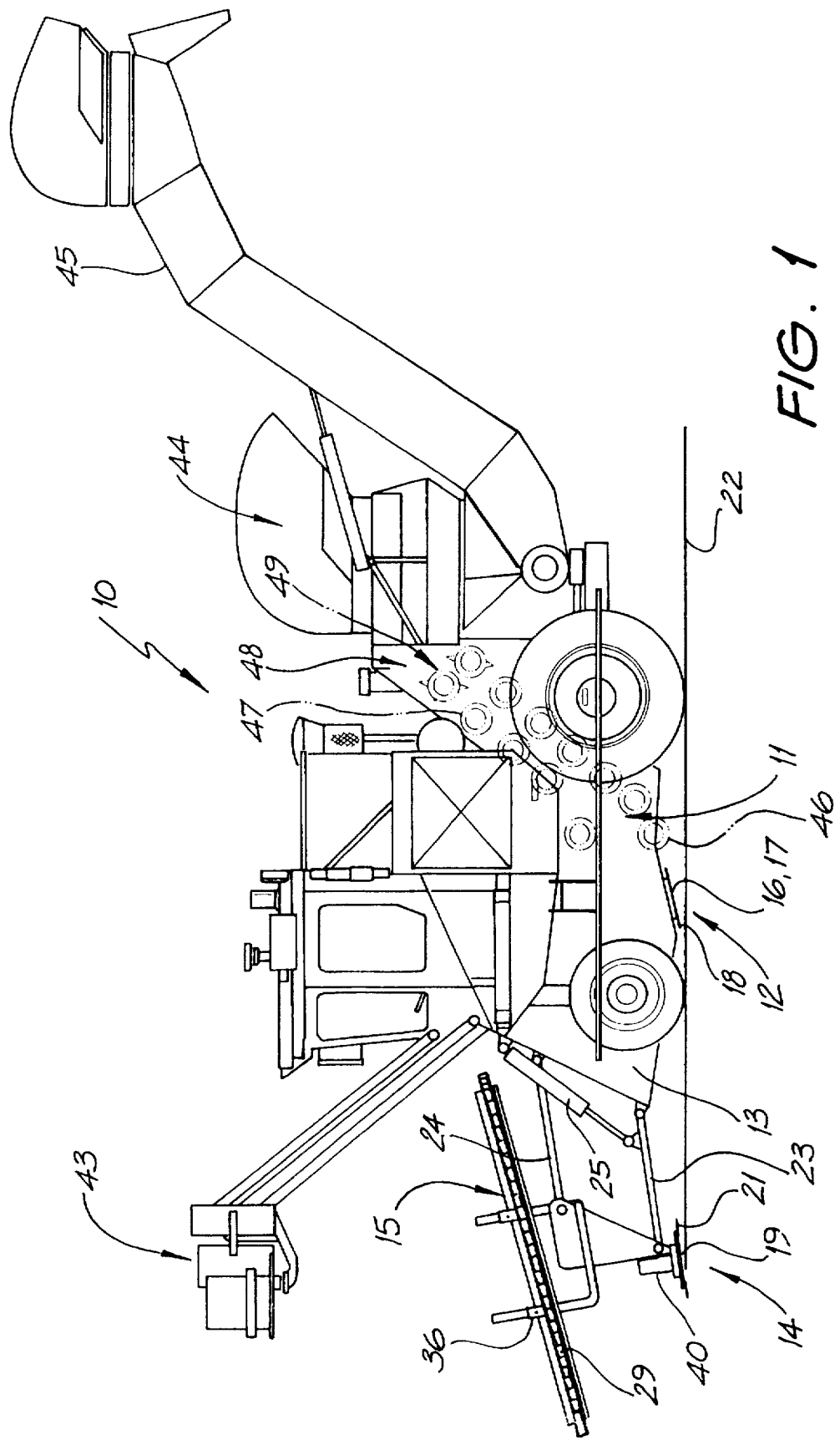
FIG. 1 is a side view of one embodiment of the cane harvester.
Figure 2:
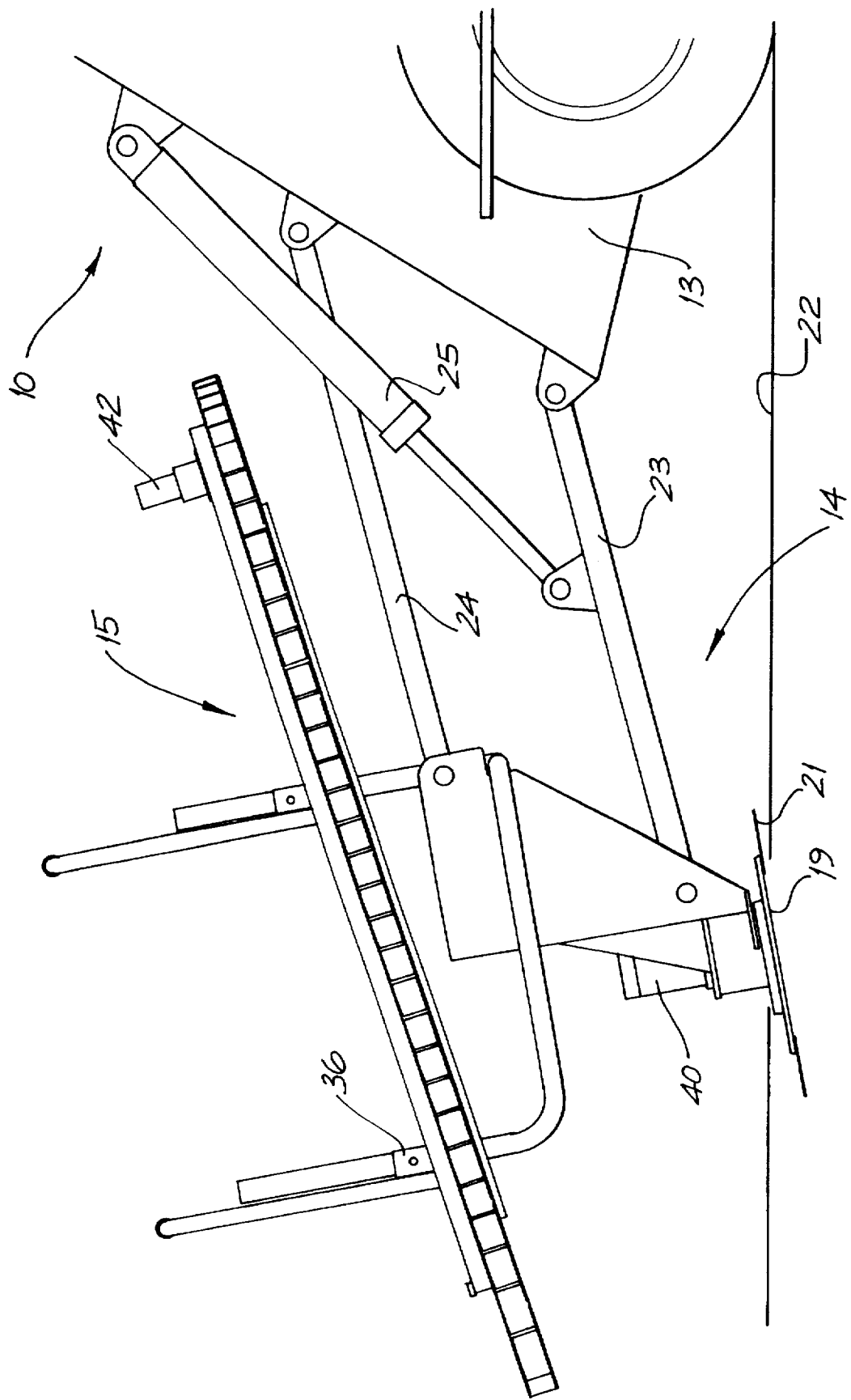
FIG. 2 is a side view of the second basecutter assembly and conveying means of the harvester in FIG. 1.

A cane harvester is generally shown as 10 in FIG. 1. The harvester 10 includes a frame 11, a first basecutter assembly 12 a topper area 43, crop feeding means 47 (in phantom) mounted immediately behind the first basecutter assembly 12 and a chopping area 48 (in phantom), a billet cleaning area 44 and a slewable elevator means 45. Mounted forwardly and outwardly from a first side 13 of the frame 11 is a second basecutter assembly generally depicted as 14 and a conveying means generally depicted as 15.

The first basecutter assembly 12 comprises two cutter discs 16 and 17, each disc having a plurality of cutter knives 18 mounted around the periphery thereof. The second basecutter assembly 14 consists in one cutter disc 19 having a plurality of cutter knives 21 mounted around the periphery thereof.

Each cutter disc 16, 17 and 19 is driven by a dedicated hydraulic motor 40 through a gear box. The cutter discs 16, 17 and 19 are mounted at an angle to the ground 22 such that cane stalks are severed at or near ground level. The basecutter assemblies 12 and 14 are each raisable and lowerable by an operator of the harvester. A butt roller 46 (in phantom) is mounted immediately behind the cutter knives 18. The feeding area includes feed rollers 47 which lead to the chopping area 48. The stalks are then chopped into billets by at least one chopper knife 49.

The second basecutter assembly 14 is mounted forwardly and outwardly from the side 13 of the frame 11 of the harvester 10 by two offset parallel linkage arms 23 and 24. The position of the arms 23 and 24 and, accordingly, the disc cutter 19 is controllable by a hydraulic cylinder 25.

The conveying means 15 comprises a pair of counter-rotating endless chains 26 and 27, between which the stalks of cane are held as the second cutter disc 19 severs the stalks from the ground. The chains 26 and 27 maintain the stalks in a substantially vertical orientation as they are conveyed to a position proximate the first row of cane.

The counter rotating endless chains 26 and 27 are arranged so as to provide a converging entrance 28 that guides the cane stalks to a position where they are gripped between the chains 26 and 27.

Figure 3:
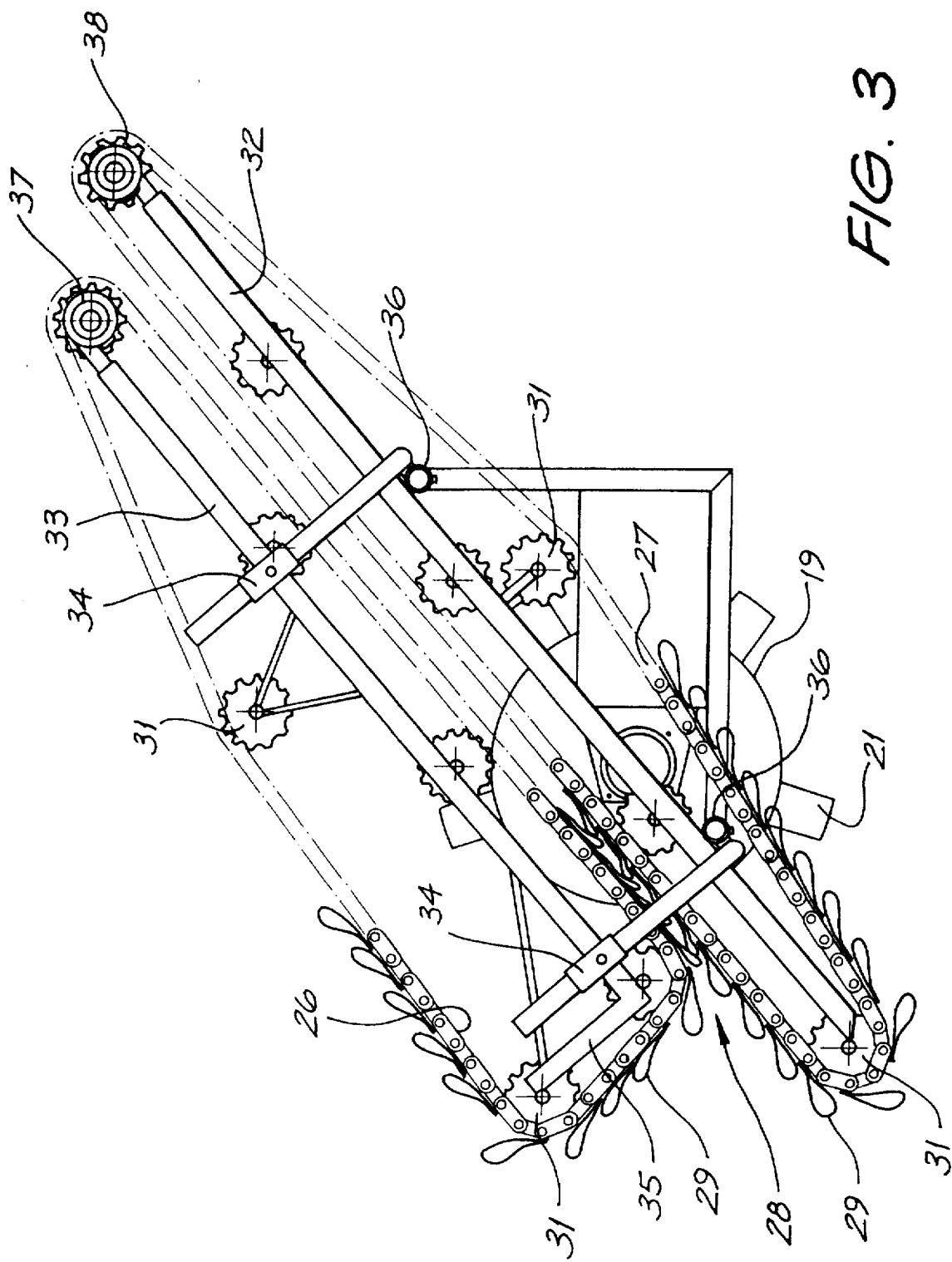
FIG. 3 is a plan view of the second basecutter assembly and conveying means of FIG. 2 with the parallel linkage arms removed.
Figure 4:
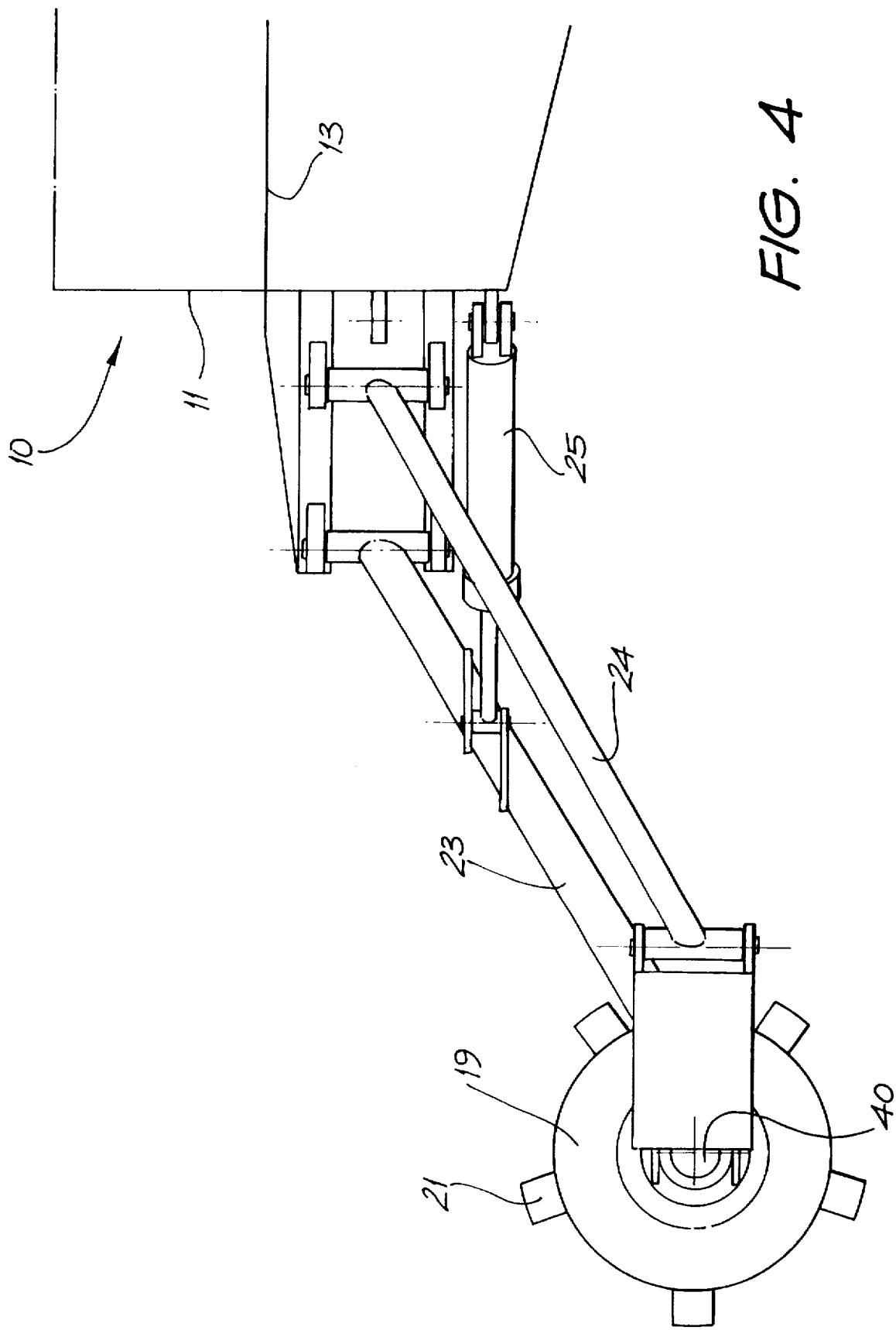
FIG. 4 is a plan view of the second basecutter assembly with the conveying means removed.

Attached to each chain 26 and 27 is a plurality of rubber loops 29 (depicted in FIG. 1 and partially depicted in FIG. 3). The plurality of rubber loops 29 provide an enhanced grip between the chains 26 and 27 and the stalks while preventing substantial damage to the stalks before their entrance to the harvester 10.

Each chain 26 and 27 is mounted on a number of support wheels 31, which are in turn mounted on support arms 32, 33 and 35 that are arranged so as to allow adjustment to the position of the support wheels thereby ensuring correct tensioning of the chains 26 and 27.

The support arms 32, 33 and 35 are mounted on a height adjuster 36 such that the height of the chains 26 and 27 in relation to the cane stalks is adjustable by the operator of the harvester 10.

The support arms 33 and 35 are mounted on side adjusters 34 such that the distance between the support arms 33 and 32 can be adjusted by the operator of harvester 10, to grip the cane tightly between opposing chains 26 and 27.

The rotation of each chain 26 and 27 is controlled by a wheel 37 and 38, respectively, both being driven by a hydraulic motor 42 mounted at an end distal the converging entrance 28 provided by the chains 26 and 27.

It will be appreciated by persons skilled in the art that numerous variations and/or modifications may be made to the invention as shown in the embodiments without departing from the spirit or scope of the invention as broadly described. The present embodiments are, therefore, to be considered in all respects as illustrative and not restrictive.

I claim:

1. A harvester for cane stalks which are planted in substantially parallel rows, comprising:

a frame having a first and a second side;

a first basecutter assembly, mounted rearwardly of a crop gathering area and coupled to the frame between its first and second sides, for severing a first row of cane stalks;

crop feeding means mounted immediately behind the first basecutter assembly that lift and feed the severed stalks to a chopping area that chops the stalks into billets;

a second basecutter assembly, mounted forwardly and outwardly from the first side of the frame, arranged to sever cane stalks in a row substantially parallel to the first row of cane stalks; and conveying means for transporting the cane stalks severed by the second basecutter assembly to a position proximate the first row of cane stalks such that the crop feeding means in addition to lifting and feeding the first row of cane stalks, lifts and feeds the severed cane stalks, transported from the substantially parallel row, to the chopping area.

2. The harvester of claim 1, wherein the base cutter assemblies each comprise at least one cutter disc having a plurality of cutter knives mounted about the periphery thereof, the cutter discs of each base cutter assembly being driven by a dedicated hydraulic motor through a gearbox and mounted at an angle to the ground such that the cane stalks are severed at or near ground level.

3. The harvester as defined in claims 1, wherein the base cutter assemblies are raisable and lowerable either automatically or manually by an operator of the harvester.

4. The harvester of claim 1, wherein the second base cutter assembly is mounted on two support members that extend forwardly and outwardly from a side of the frame of the harvester.

5. The harvester of claim 4, wherein the support members are offset parallel linkage arms with the position of the arms and the disc cutters being controllable by an hydraulic or pneumatic ram.

6. The harvester of claim 1, wherein the conveying means comprises a pair of counter-rotating endless chains having an entrance, between which the cane stalks of the substantially parallel row enter and are held as the second base cutter assembly severs the stalks from the ground.

7. The harvester of claim 6, wherein the counter-rotating endless chains are arranged so as to provide a converging entrance that ensures the stalks are guided to a position where they are gripped between the chains.

8. The harvester of claim 6, wherein there is attached to each chain a plurality of gripping means that provide an enhanced grip between the chains and the stalks while preventing substantial damage to the stalks before entrance to the harvester.

9. The harvester of claim 8, wherein the gripping means are a plurality of rubber loops.

10. The harvester of any one of claim 6, wherein each chain is mounted on a plurality of support wheels, the wheels being in turn mounted on support arms, the support arms being arranged to allow adjustment to the position of the support wheels so as to ensure correct tensioning of the chains.

11. The harvester of claim 10, wherein the support arms are arranged to be raisable and lowerable such that the height of the chains in relation to the cane stalks is adjustable by an operator of the harvester.

12. The harvester of claim 10, wherein one of the support wheels for each chain is driven by an hydraulic motor, the driven wheels being mounted at an end distal the entrance provided by the chains.

13. The harvester of claim 1, wherein the crop feeding means includes at least one butt roller that lifts the cane stalks and feeds them to a plurality of feeding rollers that in turn feed the stalks through the chopping area.

14. The harvester of claim 1, wherein once the cane stalks are in the chopping area, they are chopped into billets by at least one chopper knife.

15. The harvester of claim 1 further including a topper area which extends forwardly from the frame and severs the top of the first row of cane stalks prior to their severance from the ground by the first base cutter assembly.

16. The harvester of claim 1 further including a billet cleaning area and a slewable elevator means.

17. A harvester for cane stalks which are planted in substantially parallel rows comprising:

a frame having a first and a second side;

a first base cutter assembly, mounted rearwardly of a crop gathering area and coupled to the frame between its first and second sides, for severing a first row of cane stalks;

crop feeding means mounted immediately behind the first base cutter assembly that lift and feed the severed stalks to a chopping area that chops the stalks into billets;

a second base cutter assembly mounted forwardly and outwardly from both the first and second sides of the frame, each second base cutter assembly severing cane stalks in a row substantially parallel to the first row of cane stalks; and first and second conveying means for transporting the cane stalks severed by each of the second base cutter assemblies to a position proximate the first row of cane stalks such that the crop feeding means in addition to lifting and feeding the first row of cane stalks, lifts and feeds the severed cane stalks, transported from the substantially parallel rows, to the chopping area.

* * * * *

UNITED STATES PATENT AND TRADEMARK OFFICE
CERTIFICATE OF CORRECTION

PATENT NO. : 5,485,716
DATED : Jan. 23, 1996
INVENTOR(S) : Malcolm J. Baker

It is certified that error appears in the above-indentified patent and that said Letters Patent is hereby corrected as shown below:

On title page, Item 73(Assignee)

Delete "Autoft",

Replace with --Austoft--

Signed and Sealed this

Seventeenth Day of September, 1996

Attest:

BRUCE LEHMAN

Attesting Officer

Commissioner of Patents and Trademarks